(12) United States Patent
Bowers

(10) Patent No.: US 7,883,575 B2
(45) Date of Patent: Feb. 8, 2011

(54) COLLOIDAL SEALANT COMPOSITION

(76) Inventor: Robert B. Bowers, 442 S. Norwood Ave., Newtown, PA (US) 18940

( * ) Notice: Subject to any disclaimer, the term of this patent is extended or adjusted under 35 U.S.C. 154(b) by 1055 days.

(21) Appl. No.: 11/540,553

(22) Filed: Oct. 2, 2006

(65) Prior Publication Data

US 2008/0081217 A1 Apr. 3, 2008

(51) Int. Cl.
C04B 12/04 (2006.01)
(52) U.S. Cl. .................... 106/600; 106/14.05
(58) Field of Classification Search .......... 106/600, 106/14.05
See application file for complete search history.

(56) References Cited

U.S. PATENT DOCUMENTS

| | | | |
|---|---|---|---|
| 3,816,330 A * | 6/1974 | Havens et al. .................. 516/87 |
| 3,901,987 A * | 8/1975 | Payne et al. .................. 428/219 |
| 4,207,115 A | 6/1980 | Boehme et al. |
| 4,352,744 A * | 10/1982 | Bettinger et al. ............... 516/87 |
| 4,439,239 A * | 3/1984 | Greigger et al. ........ 106/287.16 |
| 5,043,019 A | 8/1991 | Chervenak et al. |
| 5,433,776 A * | 7/1995 | Dasgupta ................. 106/287.2 |
| 5,569,318 A * | 10/1996 | Jarand ......................... 516/87 |
| 5,584,921 A * | 12/1996 | Wagner et al. ........... 106/287.1 |
| 5,744,239 A | 4/1998 | Buccellato et al. |
| 5,836,390 A | 11/1998 | Apps et al. |
| 5,925,416 A | 7/1999 | Akstinat et al. |
| 6,209,357 B1 | 4/2001 | Bhandarkar et al. |
| 6,447,563 B1 * | 9/2002 | Mahulikar ................... 51/309 |
| 6,517,624 B1 * | 2/2003 | Jarand ......................... 106/36 |
| 6,750,257 B2 * | 6/2004 | Matsumura et al. ........... 516/81 |
| 6,869,256 B2 | 3/2005 | Greenwood et al. |
| 2004/0050297 A1 * | 3/2004 | Kobayashi et al. ..... 106/287.14 |

OTHER PUBLICATIONS

JP 358142943 A (Sakamoto et al.) Aug. 25, 1983 abstract only.*
JP 2006028335 A (Suzumura et al.) Feb. 2, 2006 abstract only.*
JP 2005120212 A (May 12, 2005) Kuga et al. abstract only.*
RO 116888 (Jul. 30, 2001) Istvan et al. abstract only.*
JP 10101964 (Ichikawa) Apr. 21, 1998 abstract only.*
JP 08067835 A (Takahama et al.) Mar. 12, 1996 abstract only.*
JP 07126555 A (Takahashi et al.) May 16, 1995 abstract only.*
JP 04255767 (Ichikawa) Sep. 10, 1992 abstract only.*
CS 260725 B1 (Michaelek) Jan. 12, 1989 abstract only.*
CS 241437 (Stepita et al.) Mar. 13, 1986 abstract only.*
CS 243225 B1 (Duda et al.) Jun. 12, 1986 abstract only.*
JP 60199073 (Yamane) Oct. 8, 1985 abstract only.*

* cited by examiner

*Primary Examiner*—Paul Marcantoni
(74) *Attorney, Agent, or Firm*—Leander F. Aulisio

(57) ABSTRACT

The present invention relates to the addition of biocidal agents to colloidal silicate coating compositions, said compositions being useful for coating structures prepared from Portland cement compositions.

5 Claims, 2 Drawing Sheets

COLLOIDAL SEALANT COMPOSITION

BACKGROUND OF THE INVENTION

The present invention relates generally to the preparation of a water-impervious concrete structure that is also resistant to biological contamination. The colloidal sealant compositions of the present invention are preferably employed along with a topcoat composition such as an epoxy coating, a urethane coating or a polyurea coating. The colloidal sealant compositions of the present invention are distributed onto the concrete structure at least twenty-four to forty-eight hours before the application of the topcoat composition. If the topcoat is semi-permeable, then any biocidal material in the colloidal sealant composition can percolate to the top of the concrete structure and be effective against surface contamination by unwanted biologics such as molds, fungus, microbes and the like. Alternatively, with a nonpermeable topcoat, the biocidal material remains in a reservoir area located between the topcoat and the upper regions of the colloidal sealant composition.

A major cause of deterioration of concrete highways, bridge decks, parking garages, streets, airport runways, parking lots, sidewalks, driveways and the like is corrosion of reinforcing steel caused by chlorides from de-icing salt, airborne ocean spray and the like. Steel can expand as it rusts and deteriorates, thus causing the concrete to crack and fracture. These problems are overcome by the use of the colloidal sealant composition of the present invention, the composition actually becoming a part of the concrete structure upon gelling. The gelled colloidal sealant composition has the ability to drive chloride ion out of the cement structure. Even deeply penetrating chloride ion is ultimately pushed into the reservoir area created by the colloidal gel.

U.S. Pat. No. 6,869,256, issued to Greenwood et al, discloses a method for sealing rock or soil. A sealing composition is employed. The sealing composition contains a silica sol and at least one gelling agent. The gelling agent is selected from the group consisting of potassium chloride, sodium chloride, calcium chloride, magnesium chloride, magnesium nitrate, magnesium sulfate and mixtures thereof.

U.S. Pat. No. 6,209,357, issued to Bhandarkar et al, discloses a process for fabricating a silica body. The process comprises the steps of: adding a tetraalkylammonium hydroxide as a stabilizing agent to a silica dispersion, allowing the dispersion to age, adjusting the isoelectric point of the silica to about 9.0 or higher by addition of a compound such as an amine, inducing gelation of the dispersion into a gel body, and drying the gel body to remove water.

U.S. Pat. No. 5,925,416, issued to Akstinat et al, relates to a method for after treating surfaces of cured and non-cured binder suspensions. A colloid solution coating is applied to the surfaces. The colloidal solution is selected from the group consisting of oxides, hydroxides, oxihydrates and heteropolyacids of metals and nonmetals. Gel formation is induced after the coating is applied.

U.S. Pat. No. 5,744,239, issued to Buccellato et al, relates to a pavement marking system containing at least one antimicrobial agent.

U.S. Pat. No. 5,043,019, issued to Chervenak et al, relates to a composition useful as a sealant or coating for concrete block walls. The composition contains water soluble silicate, water, fibers, clay and limestone.

U.S. Pat. No. 4,207,115, issued to Boehme et al, discloses a method of obtaining a finished concrete structure having a water-impervious surface. A composition containing at least one glyceryl-fatty acid ester and a paraffin wax material is added to a wet hydraulic Portland cement slurry to form a mixture. The mixture is then allowed to hydrate and harden. After hardening, the concrete structure is heated to cause the wax material to melt and fill the capillary interstices in the structure.

The above-cited references, taken either individually or in combination, do not anticipate the present invention. There is no reference to a colloidal sealant composition that forms a water-impermeable gel, the composition containing a biocide. Said composition contains no alkali or alkaline earth elements, and contains no organic functionality.

SUMMARY OF THE INVENTION

The present invention relates to a composition for formation of a subsurface barrier for a substrate that employs Portland cement as binder. The composition comprises a colloidal silica composition substantially free of alkali metal and alkaline earth metal cations. It is also substantially free of organic compounds such as organosilicates and the like. The composition further comprises a water-soluble or water-dispersible additive composition. The additive composition is preferably a member selected from the group consisting of fluorescent dyes, nonfluorescent dyes, biocides, bactericides, fungicides, microbicides, pesticides, perfumes, deodorants and mixtures thereof. The composition is aqueous based for ease of application on cement compositions. The level of solubility of the additive compositions can be varied to produce different results such as degree of concentration relative to depth in the substrate.

A process is disclosed for preparing a water impenetrable gelled film. It is employed for permanently hydrostatically sealing a substrate that employs Portland cement as binder. The composition gels as by contact with alkali metal and alkaline earth metal cations present in the substrate to obtain an impenetrable gelled film. The film is situated at least about ¼ inch below the surface of the substrate; and the additive composition is situated between the surface of the substrate and the impenetrable film.

DETAILED DESCRIPTION OF THE INVENTION

Figure 1:
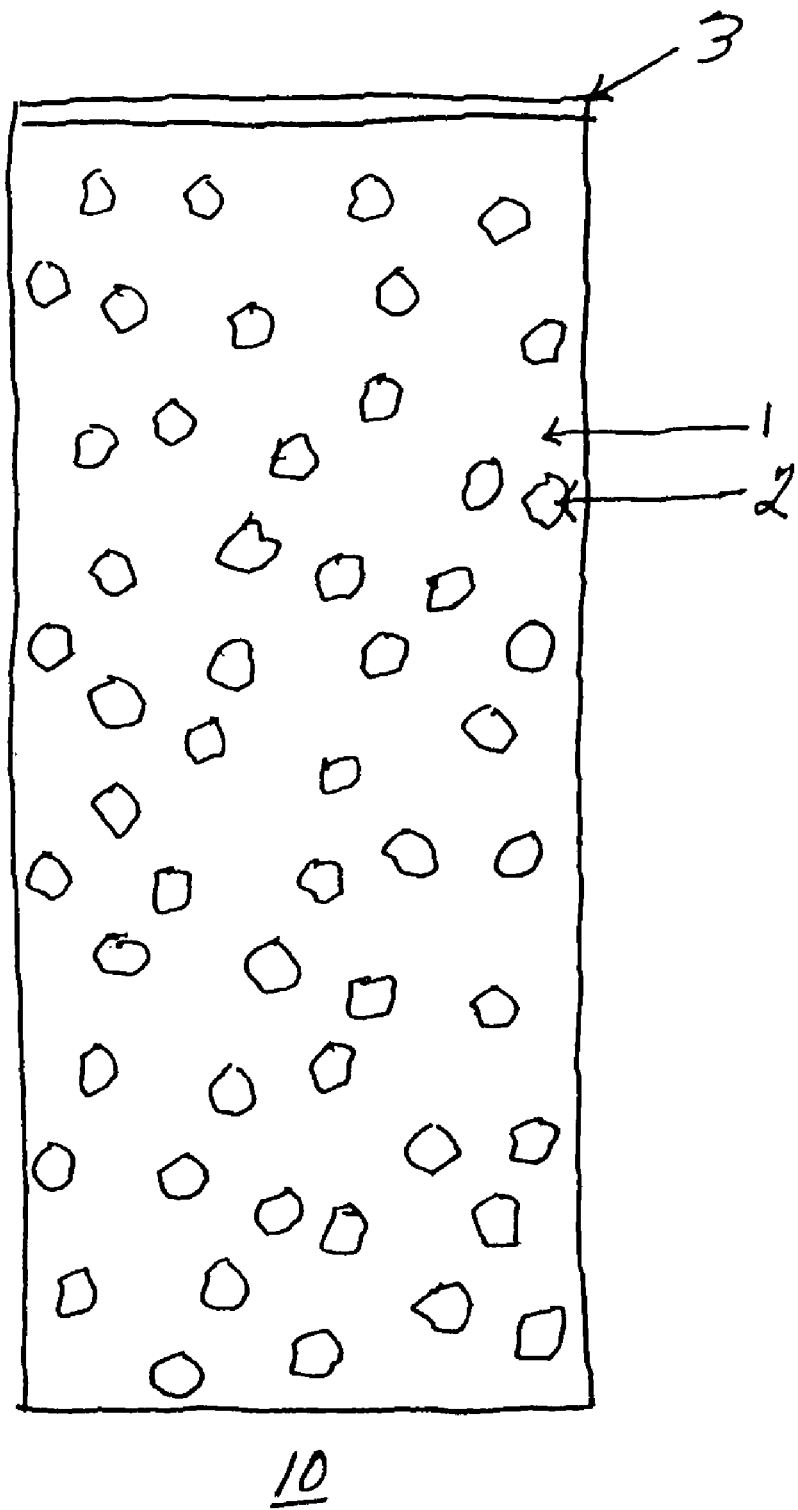
FIG. 1 is an example of untreated concrete structure that has a thixotropic coating.

Many colloidal silica compositions are on the market. Each of these compositions can be employed as a sub-surface treatment for Portland cement concrete that is topically applied by various different methods. Some manufacturers of these colloidal silica compositions are: Durassure Corporation; Dynacrete Corporation; Enduro-Seal USA, Inc.; The Aquron Corporation; HydroSeal/Hydrocrete Corporation; and MidCal, Inc. Possibly other manufacturers, using a private label arrangement, also supply said colloidal silica compositions. The present invention relates to the use of any of these compositions.

Examples of preferred compositions are: Durassure CF-9000 integral sealer (also referred to as SealMax densifier), Aquron CPT-2000 and Aquron 7000. Durassure CF-9000 is a concrete preservation treatment solution that is aqueous and clear, or slightly milky white in appearance.

None of the above are sodium silicate products. The solution is 0% solids before application, and becomes 100% solids after curing and gelling. The gelled product provides subsurface molecular bonding and waterproofing for new concrete installations as well as old concrete structures. The clear solution is a highly reactive catalytic agent that reacts with free alkali and/or alkaline hydrates to internally produce a silica hydrogel. Said hydrogel fills the pore spaces and the voids around the aggregate. The so treated concrete is permanently and hydrostatically sealed from within. The solution is typically applied with a high pressure airless sprayer. Other means of application are: a low pressure sprayer or the like. Examples of concrete structures that can be preserved are: bridges, decks, streets, airport runways, parking garage decks, sidewalks, driveways building foundations and the like. Some features of the topical coating are: permanent sealing of the concrete structure, preservation of matrix integrity, excellent pre-treatment for coating systems such as paints and the like, improvement of thermal resistance, prevention of internal water migration, improvement of chemical resistance, and attenuation of excessive water vapor transmission.

Aquron 7000 is a solution that is clear to green, contains 0% solids and is aqueous. It is not a sodium, potassium or lithium silicate product. Aquron 7000 reduces or eliminates soluble chloride via displacement, and thus reduces corrosion of embedded steel. Upon gellation, the solution becomes 100% solids. The solution is applied to a concrete substrate with an airless paint sprayer. Preferably, it is applied twice to the point of saturation (ie. where runoff is about to occur), with back to back applications. After the second application, Aquron CPT-2000 is applied to the concrete substrate. The Aquron 7000 is formulated to provide extended corrosion protection to steel rebar.

The colloidal silica compositions react with water in a different fashion than sodium silicate compositions. A hydrated sodium silicate forms a noncrystalline film. Once water is removed from the hydrated sodium silicate, it becomes very crystalline and loses its barrier film-like properties. The colloidal silica compositions, however, never become crystalline, even in the absence of water. Distinct spherical shaped particles are present in the colloidal silica compositions. The particles contain microscopic pores that are much smaller than a water molecule. All of the water present in the concrete before coating with the colloidal silica compositions is "tied up" in the gel, and cannot do harm to the concrete. Water from the outside will either be absorbed in the gel or simply cannot penetrate into the concrete. Unless the temperature rises above 115 degrees C., the water content of the hydrogel will not get lower than 6.5% of the total water capacity of the gel. If the treated concrete surface does become dehydrated, addition of water rehydrates the treated concrete to once again form the highly insoluble network of tightly linked spherical shaped particles. Conventional silicate solutions, such as sodium silicate, lithium silicate and potassium silicate, form a soluble gel that is very temporary. This is because they become highly crystalline upon removal of water.

All of the above colloidal silica compositions can form a small reservoir of at least about one quarter of an inch next to the surface of the treated concrete structure. This reservoir exists due to concrete porosity increasing in size nearer the surface; and the mechanism of the gel losing its ability to continue to move solubilized matter out of the concrete and toward the surface. The present invention makes use of this fact to provide a reservoir filled with desirable reagents such as biocides and the like. This small reservoir can be called a "transition zone", as it is substantially devoid of the spherical shaped particles resulting from catalysis and gellation of the colloidal silica composition. Immediately below the transition zone is the area of most densely situated spherical shaped particles of hydrogel that are tightly bound to form a network. This area of highest density occurs about 6-10 millimeters below the surface of the concrete structure. There is then a dramatic decrease in density of the hydrogel network between 6 millimeters and about 10 millimeters. However, the gel can penetrate the concrete structure down to about 250 millimeters and beyond. Entrapped chlorides and other deleterious soluble and semi-soluble substances are forced to migrate upwardly through the gel and toward the surface of the concrete, where they become situated in the "transition zone".

When a paint or a surface covering, such as a topcoat composition, is applied to the treated concrete structure, a "sandwich effect" occurs wherein the desirable reagents such as biocidal materials and dye compositions are sealed between the paint (or topcoat composition) and the colloidal silica hydrogel. Further, desirable reagents have the ability to migrate laterally along the "transition zone" because of the "sandwich effect". In a preferred embodiment, the paint composition is a member selected from the group consisting of epoxy, polyurethane, and polyurea. Preferably, the surface covering is a member selected from the group consisting of bisphenol A resins, cycloaliphatic resins, urethane resins and silicone resins. It is within the scope of the present invention to employ any paint or topcoat composition that remains substantially on the surface of the concrete structure. Deeply penetrating paints or surface coatings can in special cases interfere with formation of an optimum transition zone.

In a preferred embodiment, the present invention envisions use of a biocide and an invisible UV tracer. The UV tracer is visible under a black light, typically 350-400 nanometers in wavelength, and provides a method of detection for the presence of the product and its additive biocide in the transition zone. It also provides a means of determining if the composition has been accidentally spilled on the flesh or the clothing of the installer; or has contaminated an area where it may be undesirable to do so. Both UV tracer and biocide can be added directly to the aqueous colloidal silica composition. Preferably, the biocide is Dowicide A (manufactured by the Dow Chemical Co.). In the alternative, the UV tracer and biocide can be added directly to the paint composition or topcoat composition. In this instance, the additives migrate downwards into the transition zone formed by the gelled colloidal silica. In a preferred embodiment the UV tracer and the biocide are added in a positive amount up to about 8% by weight of the colloidal silica composition. Most preferably, either a single additive, or a combination of additives, is added to the colloidal silica aqueous composition in an amount of about 2% or less by weight. In a preferred embodiment, the UV tracer is a fluorescent blue dye marketed by Day-Glo Corporation.

In an alternative embodiment, the colloidal silica composition, which is a nonthixotropic material that remains amorphous even in the absence of water, can be used in conjunction with a thixotropic material to form a highly effective sandwich that contains desirable reagents dispersed within the sandwich structure as "filling". A thixotropic fluid is one that decreases in viscosity at constant shear rate and increasing time of shear, but which returns to the original viscosity upon termination of shear conditions. Examples of thixotropic materials are bisphenol A/alkyl glycidyl ether resins with hardeners such as aliphatic amines and Mannich bases.

The present invention relates to a composition for formation of a subsurface barrier for a substrate that employs Portland cement as binder. The composition comprises a colloidal silica composition substantially free of alkali metal and alkaline earth metal cations. It is also substantially free of organic compounds such as organosilicates and the like. The composition further comprises a water-soluble or water-dispersible additive composition. The additive composition is preferably a member selected from the group consisting of fluorescent dyes, nonfluorescent dyes, biocides, bactericides, fungicides, microbicides, pesticides, perfumes, deodorants and mixtures thereof. The composition is aqueous based for ease of application on cement compositions. The level of solubility of the additive compositions can be varied to produce different results such as degree of concentration relative to depth in the substrate.

The barrier forming composition contains water in a substantial amount. The barrier forming composition contains the colloidal silica composition in an amount of about 20 weight % solids to about 70 weight % solids. In a preferred embodiment, the colloidal silica composition is present in an amount of about 40-50 weight % solids. The composition is gellable, nonthixotropic and viscous. Upon curing, the barrier forming composition creates a network of gelled particles that form a deeply penetrating reinforcement that is substantially impenetrable to water. The properties of the barrier forming composition are such that, upon curing, the composition forces many undesirable ingredients, such as chloride ions, to the surface of the cement structure. Subsurface steel structures are thus protected from corrosion; as they are typically located below the described transition zone.

The substrate that employs Portland cement as binder is a member selected from the group consisting of unreinforced concrete, reinforced concrete, cast-in-place concrete, precast concrete, post-tensioned concrete, pavers, concrete block, concrete pipe, grouts, stucco, shotcrete, gunnite, pool plaster, concrete siding and products made from concrete that mimic natural stone. It is within the scope of the present invention to employ the inventive composition on vertical as well as horizontal surfaces. It is also within the scope of the present composition to treat structures such as patios, bathrooms, school corridors, hospital floors, clean rooms and the like.

The additive composition is present in a positive amount up to about 10% by weight. Preferably, the additive is a biocide. Most preferably, the additive is a combination of a biocide and a fluorescent marker composition. In a preferred embodiment, the biocide is Busan-11-M7; the chemical name being barium metaborate monohydrate. The marker composition is useful for disclosing if and where the composition has been applied on the cement structure.

A permanently sealed substrate that employs Portland cement as binder is disclosed. The substrate is permanently sealed by a process comprising the steps of: obtaining a composition comprising: (a) a colloidal silica composition substantially free of alkali metal and alkaline earth metal cations, and substantially free of organic compounds; (b) a water-soluble or water-dispersible additive composition that is a member selected from the group consisting of fluorescent dyes, nonfluorescent dyes, biocides, bactericides, fungicides, microbicides, pesticides, perfumes, deodorants and mixtures thereof; and (c) water; contacting the composition with the substrate; and drying the substrate for a time of at least about 1 hour. The composition gels as by contact with alkali metal and alkaline earth metal cations present in the substrate to obtain an impenetrable gelled film. The film is situated at least about ¼ inch below the surface of the substrate. The additive composition is situated between the surface of the substrate and the impenetrable film.

The colloidal silica composition is present in an amount of about 20 weight % solids to about 70 weight % solids. Preferably, the silica composition is present in an amount of about 40-50 weight % solids.

A process is disclosed for preparing a water impenetrable gelled film. It is employed for permanently hydrostatically sealing a substrate that employs Portland cement as binder. The process comprises the steps of: (1) obtaining a composition comprising: (a) a colloidal silica composition substantially free of alkali metal and alkaline earth metal cations, and substantially free of organic compounds; (b) a water-soluble or water-dispersible additive composition that is a member selected from the group consisting of fluorescent dyes, nonfluorescent dyes, biocides, bactericides, fungicides, microbicides, pesticides, perfumes, deodorants and mixtures thereof; and (c) water; (2) contacting the composition with the substrate; and (3) drying the substrate for a time of at least about 1 hour. The composition gels as by contact with alkali metal and alkaline earth metal cations present in the substrate to obtain an impenetrable gelled film. The film is situated at least about ¼ inch below the surface of the substrate; and the additive composition is situated between the surface of the substrate and the impenetrable film.

The substrate that employs Portland cement as the binder is a member selected from the group consisting of unreinforced concrete, reinforced concrete, cast-in-placed concrete, precast concrete, post-tensioned concrete, pavers, concrete block, concrete pipe, grouts, stucco, shotcrete, gunnite, pool plaster, concrete siding and products made from concrete that mimic natural stone.

The colloidal silica composition is gellable, nonthixotropic and viscous. It is impermeable to substantially all known chemical substances. Even when water is removed, the coating does not crystallize. The composition penetrates the surface of the cement and establishes itself as a subsurface layer having a thickness up to about 4 inches. Deeper penetration can be achieved if more than one coat is applied in a sequential fashion. Once the colloidal silica composition is cured, it pushes all contaminants into the volumetric space between the cured colloidal silica composition and the upper surface of the substrate. The space between the cured colloidal silica composition and the surface of the cement substrate, defined as the transition zone, is filled with a water-soluble or water-dispersible additive composition. The additive composition is a member selected from the group consisting of fluorescent dyes, nonfluorescent dyes, biocides, bactericides, fungicides, microbicides, pesticides, perfumes, deodorants and mixtures thereof. In a preferred embodiment, the additive composition is at least a biocide such as Dowicide.

Once the colloidal silica composition is applied to the concrete substrate and cured, it can be sealed with an epoxy topcoat. It is within the scope of the invention to employ other topcoats, such as urethanes and the like. The epoxy topcoat can contain sand, and can be a nonglossy topcoat or a glossy topcoat FIG. 1 is an example of untreated concrete that has a thixotropic coating. Concrete structure 10 is comprised of matrix 1 and embedded stone 2. The structure 10 is coated with a thixotropic coating 3. Moisture has access to the bottom of the coating. It can also move into the concrete. Any steel reinforcement beams in the concrete are then exposed to moisture. Biocidal compositions that are added to the coating are easily dispersed and diluted to the point where they are ineffective.

Figure 2:
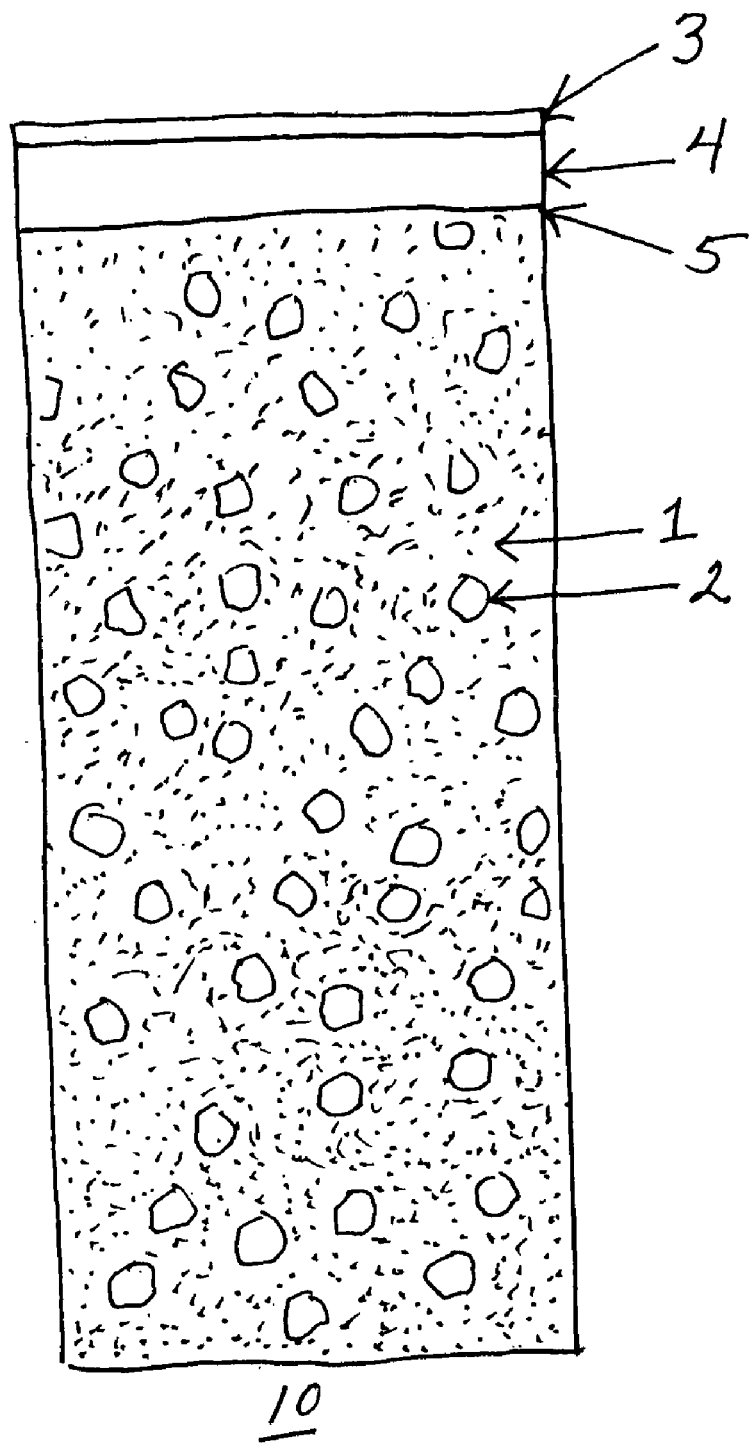
FIG. 2 is an example of a treated concrete structure that has a thixotropic coating, a sub-surface gel layer, and a transition zone between the coating and the gel layer; the transition zone holding a biocidal material.

FIG. 2 is an example of a treated concrete that has a thixotropic coating, a sub-surface reservoir that contains a biocidal material, and a gel layer that holds the biocidal material in the reservoir. Concrete structure 10 is comprised of a cement matrix 1 and embedded stone 2. A colloidal silica gel matrix 5 forms a substantially impermeable barrier layer that is sub-surface. The gel matrix 5 is formed from a composition that is a colloidal silica material substantially free of alkali metal and alkaline earth metal cations. Further, the composition contains substantially no organic compounds. The structure 10 is coated with a thixotropic coating 3. Preferably, the thixotropic coating is an epoxy compound. A transition zone 4 is positioned between the thixotropic coating 3 and the gel matrix 5. Contained within the transition zone 4 is a biocidal composition that is water-soluble or water dispersible. Also contained within the transition zone 4 is a dye composition sensitive to UV light. Free moisture is prevented from moving into the concrete by the gel layer. The biocidal material remains active for an extended period of time. It can migrate laterally, but cannot move away from the reservoir area. If the biocide employed is Busan 11-M7, then an added benefit of the composition is that steel corrosion is prevented. This is quite important when reinforcing steel is positioned near the surface of the concrete. "Rust bloom" is effectively prevented.

Durassure and Aquron, proprietary colloidal silica based materials, produce a silica-hydrogel below the surface and inside the matrix when they are employed as a treatment for Portland cement concrete. The hydrogel becomes part of the concrete. This hydrogel contains distinct spherical shaped particles. These particles have pores that cannot be penetrated by water since they have dimensions that are smaller than that of a water molecule. The hydrogel so formed does not become crystalline, but rather is amorphous, in the absence of water. Silicates such as potassium silicate, sodium silicate and lithium silicate become crystalline when water is removed. Further, the hydrogel of the Aquron product and of this invention will rehydrate upon addition of water.

Chloride ion is a major problem for concrete surfaces. It can deeply penetrate into the concrete and cause much damage over time. Any steel reinforcement imbedded into the concrete is also attacked by chloride ion. A hydrogel formed by a product such as Durassure or Aquron protects the concrete form chloride ion and other contaminants. The hydrogel has a pH of about 12 or greater and is a 100% solids composition upon curing. Prior to curing, the Durassure or Aquron is substantially nil in solids content. This feature allows for ease of application to concrete surfaces and the like. Curing is effected by contact of the liquid Aquron product with the in situ free alkali and alkali hydrates within the concrete. An internally formed colloidal silica hydrogel is the final product.

The biocidal composition of the present invention comprises an environmentally friendly reactive mixture useful in preserving concrete. Preservation is obtained by chemical formation of a highly complex colloidal silica hydrogel that functions as a barrier to corrosive and harmful materials. The colloidal silica hydrogel also acts as a dessicant, removing unwanted water from the concrete. Free alkali or alkali hydrates found in high aluminate cement concrete mixtures activate the formation of the hydrogel barrier. As a result of such activation, the alkali or alkali hydrates are converted into neutral compounds. The hydrogel acts as a barrier to substantially all known compounds. It readily fills the voids found in cement concrete mixtures. It does not form on the surface of the concrete, but establishes a network of solid particles about an inch below the surface of the concrete, and extends downwardly into the concrete to a depth of about 4 to 5 inches.

Penetration tests have shown that the active catalyst can migrate to depths greater than eight inches. Various forms of the colloidal silica material can penetrate and then form a gel as deeply as ordinary water can typically penetrate the subject concrete. Some concrete structures have been penetrated by water to a depth of several feet. Typically, the colloidal silica compositions penetrate a concrete substrate to a depth of about three to five inches.

EXAMPLE

A damaged section of a concrete walkway is identified. The damage is judged to be repairable. Loose chips, debris and foreign matter are removed from the site. The surface of the damaged concrete is then cleaned with an aqueous composition containing a cleaning agent. The surface is allowed to dry.

The cleaned surface is then treated with a first application of the colloidal silica composition of the present invention. The composition is prepared by addition of Dowicide biocidal agent and a fluorescent dye to Aquron 2000. This composition (Protocap™) is then added to a pump type sprayer. The composition is sprayed onto the surface of the damaged section of concrete walkway. A uniform coating is applied. The composition penetrates into the concrete and begins to form a gel. After penetration of the first coat into the concrete, a second coat is applied just prior to the drying of the first coat. A second coat is employed to achieve deeper penetration of the gel or to prevent possible holidays from the first coat application.

After 36 hours, having determined that the internal moisture of the concrete has reached equilibrium, a topcoat is then applied to the section of concrete. An epoxy topcoat (Schmooze™) is brushed onto the treated section of concrete. The ambient temperature for application of the epoxy topcoat is between 60 degrees F. and 90 degrees F. After the topcoat cures, the walkway is returned to service. After an extended period of time, a UV sensor is employed to guarantee that the biocidal material is uniformly present in the damaged section of concrete.

While the invention has been described by a specific example and embodiments, there is no intent to limit the inventive concept except as set forth in the following claims.

I claim:

1. A composition for formation of a subsurface barrier for a substrate that employs Portland cement as binder, the composition comprising:
    (a) a colloidal silica composition free of alkali metal and alkaline earth metal cations, and free of organic compounds;
    (b) a water-soluble or water-dispersible additive composition that is a member selected from the group consisting of biocides, bactericides, fungicides, microbicides, pesticides and mixtures thereof, wherein the additive composition is present in an amount greater than 1% up to about 10% by weight; and
    (c) water.

2. A composition according to claim 1 wherein the colloidal silica composition is present in an amount of about 20 weight % solids to about 70 weight % solids.

3. A composition according to claim 2 wherein the colloidal silica composition is present in an amount of 40-50 weight % solids.

4. A composition according to claim 1 wherein said composition is gellable, nonthixotropic and viscous.

5. A composition according to claim 1 wherein the substrate that employs Portland cement as binder is a member selected from the group consisting of unreinforced concrete, reinforced concrete, cast-in-place concrete, precast concrete, and post-tensioned concrete.

* * * * *